United States Patent [19]
Kogert

[11] 3,770,561
[45] Nov. 6, 1973

[54] CUT RUBBERISED STRANDED WIRE

[76] Inventor: Herbert Kogert, Huttellbergstrasse 7a, 1140 Vienna, Austria

[22] Filed: Dec. 13, 1971

[21] Appl. No.: 207,078

Related U.S. Application Data
[62] Division of Ser. No. 881,235, Dec. 1, 1969.

[30] Foreign Application Priority Data
Dec. 5, 1968   Austria .................. A 11890/68

[52] U.S. Cl................ 161/144, 156/270, 156/510, 161/175
[51] Int. Cl.......................... B32b 5/08, B32b 25/02
[58] Field of Search........................... 140/139, 140; 156/88, 269, 270, 522, 523, 380, 272–274, 510; 161/60, 143, 144, 175; 219/121, 121 EB; 331/94.5; 250/49.5; 264/145, 160

[56] References Cited
UNITED STATES PATENTS
2,732,881   1/1956   Anderle ............................... 156/88
3,597,578   8/1971   Letchworth ......................... 219/121

*Primary Examiner*—William A. Powell
*Attorney*—Werner W. Kleeman

[57] ABSTRACT

A laser cut rubberized wire, in particular serving as a reinforcing insert for a tire, comprising steel cord wire elements enclosed in a rubber coating, said wire elements having laser cut ends which are rounded or fused.

3 Claims, 5 Drawing Figures ically depicted a preferred construction of apparatus for carrying out the teachings of the invention, and such will be seen to embody a roller track 1 which conveys a reinforced rubberized steel wire fabric 2 which is to be cut so as to pass below a high-energy laser device 3. Laser device 3 is mounted on transverse rails 4 so as to enable the laser device 3, which is the source of the laser beam, to be moved along the required cutting line by any suitable means which have not been particularly shown.

FIGS. 2 and 3 illustrate details of the arrangement at the cutting zone wherein four cooled bars 5 are provided, each such cooled bar extending parallel to the

CUT RUBBERISED STRANDED WIRE

CROSS-REFERENCE TO RELATED CASE

The present application is a divisional of my commonly assigned, co-pending U.S. Pat. application, Ser. No. 881,235, filed Dec. 1, 1969 and entitled "PROCESS AND APPARATUS FOR CUTTING RUBBERISED STRANDED WIRE."

BACKGROUND OF THE INVENTION

The present invention deals with laser cut rubberized wire, in particular serving as a reinforcing insert for the manufacture of tires, wherein said laser cut rubberized wire is fabricated according to the process and apparatus disclosed in my previously mentioned U.S. Pat. application, Ser. No. 881,235.

Such reinforcing inserts have heretofore been cut from a length of rubberized wire through the use of mechanical cutting devices, such as hammer shears or rotary blade cutters. Such cutting devices, however, possess the disadvantage, in particular where steel cord inserts are concerned, that during the cutting action the strands tend to fan out, therefore their ends constitute a danger point in the finished tire. A source of internal damage to the tire structure is often formed due to the fact that the wire strand ends cut into the rubber structure and form cracks which are then enlarged by the flexing action of the tire during usage. Furthermore, with mechanical cutting operations the surface bonding layer of the steel cords, provided for the purpose of improving the adherence to the rubber, is broken at the cut, again increasing the danger of subsequent damage to the finished tire during use.

The viability of a laser, and in particular a gas laser in the field of tire manufacture, has heretofore been regarded as unprofitable, considered by those skilled in the art to be both uneconomical and unsuitable. The former was based upon the expense involved and the latter in view of the general opinion that such widely differing materials as rubber and metal could not be simultaneously cut by a single laser beam because the rubber would burn away from the metal had been properly cut.

SUMMARY OF THE INVENTION

In my previously mentioned co-pending United States application, there was disclosed both the process and apparatus for cutting rubberized wire, by means of which the cutting operation was carried out by a laser beam moved along a desired line of cut, and preferably employing a gas laser for projecting the laser beam used to cut the rubberized wire.

It has been surprisingly found that the cutting of such dissimilar materials as rubber and metal is possible with laser energy and may be effected very efficiently by using a 250 Watt $CO_2$ gas laser. Microscopic examination of the cut surfaces of the individual wires cut by the laser beam shows that there are no sharp edges, and the majority of such wire ends are in fact rounded-off by a melting process.

The action of the laser beam does not merely cut the stranded steel cords, but these are melted at the cutting zone, so that instead of their being present the sharp edges which are formed during conventional cutting operations, the ends are actually rounded-off, thus substantially eliminating the danger of any cutting action within a finished tire during use.

Hence, from what has been stated above it is a primary objective of the present invention to provide an improved article of manufacture, namely a laser cut rubberized wire, in particular serving as a reinforcing insert for a tire, consisting of wire elements enclosed in a rubber coating, these wire elements having laser cut ends which are devoid of any sharp edges, and in particular wherein such cut ends are rounded or fused.

Furthermore, it has been found that a modification of the surface takes place in the zone of the cut. This provides for improved bonding properties, particularly if the cutting zone has been cooled by a cooling device, since such prevents destruction of the rubber coating in the area adjacent the cut.

In order to remove any danger of the rubber igniting, at least one jet of a shielding gas is directed over the cutting zone. For example, the shielding gas may be nitrogen, carbon dioxide or a rare gas. In order to keep the zone of the cut and its environment free of decomposition products, it is convenient to provide an appropriate suction device at the zone of the cut as will be explained more fully hereinafter.

Several layers can be simultaneously cut if they are held firmly together. Otherwise, any combustion gases tend to "glow" between the layers and lead to blackening at the edges. The cooling equipment employed in the practice of the invention serves to exert a pressure on individual layers, if more than one layer is inserted into the cutting device, so that they remain in contact with one another, and hence overcome this problem.

BRIEF DESCRIPTION OF THE DRAWING

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
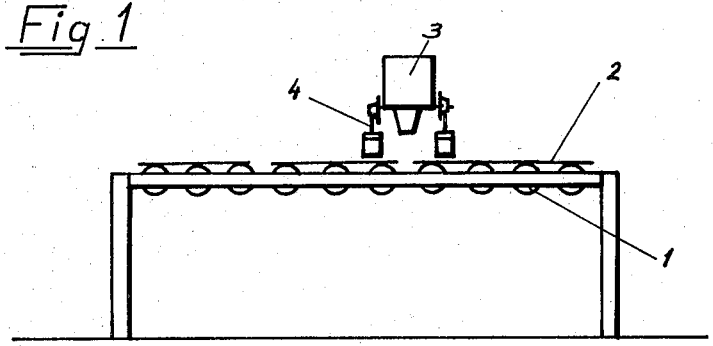
FIG. 1 is a schematic illustration of one exemplary embodiment of equipment used in the practice of the invention.
Figure 2:
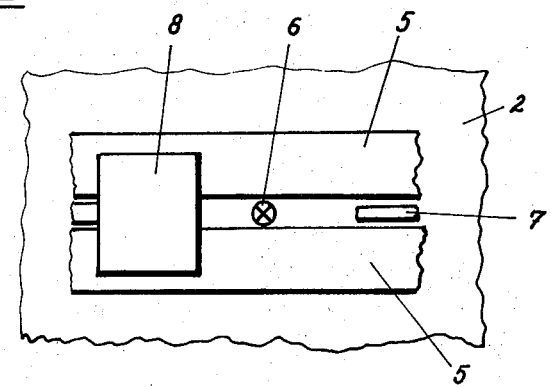
FIG. 2 is a fragmentary plan view of the cutting area in the embodiment depicted in FIG. 1.
Figure 3:
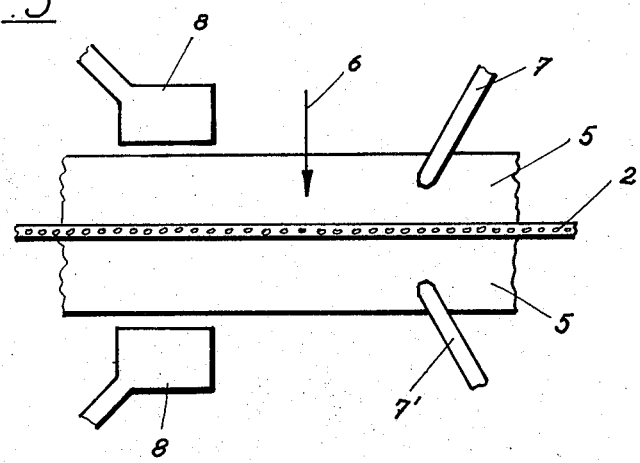
FIG. 3 is a cross-sectional view of the cutting area of the exemplary embodiment of FIG. 1.

Describing now the drawings, in FIG. 1 there is schecutting line, and two of the cooled bars 5 being located above the reinforced fabric or web 2 and two located below such fabric or web, with one such cutting bar disposed to each side of the cutting line. Hence, the reinforced fabric or web 2 can be clamped between the cooled bars 5 prior to the cutting operation. The laser device 3 is then driven along the rails 4 so that its beam 6, the cross-section of which has been indicated in FIG. 2, is directed between the upper pair of cooling bars 5 onto the reinforced fabric or web 2. At the point of impact of the laser beam at the reinforced fabric or web 2 there is provided a shielding gas flow by means of an upper jet 7 and a lower jet 7', this gas flow is drawn-off by suction devices 8, one being located above and the other below the reinforced web 2.

During some applications it may be more convenient to employ a stationary laser device, the laser beams 6 being moved along the line of cut by any appropriate optical deflecting system.

Figure 4:
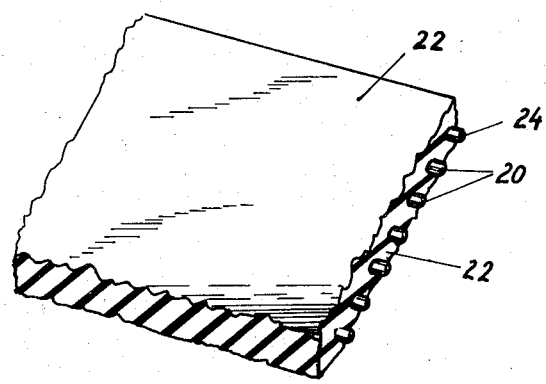
FIG. 4 is an enlarged schematic view showing details of the laser cut rubberized wire produced in accordance with the teachings of this invention.
Figure 5:
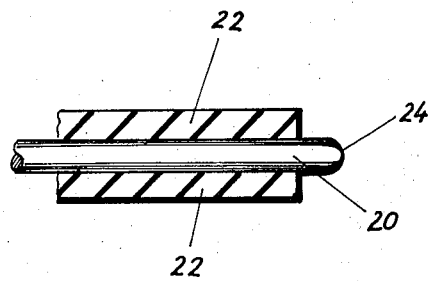
FIG. 5 is an enlarged section of the laser cut rubberized wire of FIG. 4, showing the cut rounded or fused wire end.

Finally, in FIGS. 4 and 5, there is schematically depicted on an enlarged scale for the purposes of showing details, a laser cut rubberized wire produced in accordance with the previously considered manufacturing techniques and by means of the equipment described above, and in particular serving as a reinforcing insert for a tire. It will be seen that this laser cut rubberized wire comprises wire elements 20, typically steel cord wire elements, enclosed in a rubber casing or coating 22. These wire elements 20 have laser cut ends 24 which are devoid of any sharp cut edges, specifically have the material forming such wire elements rounded or fused, as shown. As previously explained, the absence of any such sharp edges, here possible when working with laser energy, and as opposed to the heretofore employed mechanical cutting operations, safeguards against any possible internal damage to the tire structure which otherwise might arise if such sharp edges were present.

While there is shown and described present preferred embodiments of the invention, it is to be distinctly understood that the invention is not limited thereto but may be otherwise variously embodied and practiced within the scope of the following claims. ACCORDINGLY,

What is claimed is :

1. A laser cut rubberized wire, in particular serving as a reinforcement insert for a tire, comprising wire elements enclosed in a rubber coating, said wire elements having laser cut ends devoid of sharp edges.

2. A laser cut rubberized wire as defined in claim 1, wherein said laser cut ends of said wire elements are rounded or fused.

3. A laser cut rubberized wire as defined in claim 2, wherein said wire elements comprise steel cord.

* * * * *